(12) United States Patent
Abe

(10) Patent No.: US 7,909,700 B2
(45) Date of Patent: Mar. 22, 2011

(54) SCENE SELECTION SCREEN GENERATION DEVICE, SCENE SELECTION SCREEN ADDING SYSTEM, METHOD FOR GENERATING SCENE SELECTION SCREEN, METHOD FOR ADDING A SCENE SELECTION SCREEN, IMAGING DEVICE, AND COMPUTER READABLE STORAGE MEDIUM HAVING RECORDED THEREON A PROGRAM

(75) Inventor: Yoshinori Abe, Akishima (JP)

(73) Assignee: Casio Computer Co., Ltd., Tokyo (JP)

( * ) Notice: Subject to any disclaimer, the term of this patent is extended or adjusted under 35 U.S.C. 154(b) by 922 days.

(21) Appl. No.: 11/804,491

(22) Filed: May 18, 2007

(65) Prior Publication Data

US 2007/0286568 A1 Dec. 13, 2007

(30) Foreign Application Priority Data

May 19, 2006 (JP) .................. 2006-140165
Feb. 13, 2007 (JP) .................. 2007-031591

(51) Int. Cl.
*G06F 17/00* (2006.01)
(52) U.S. Cl. ........................................... 463/47
(58) Field of Classification Search .............. 463/47; 396/123; 348/222.1, 231.99
See application file for complete search history.

(56) References Cited

U.S. PATENT DOCUMENTS

| 2004/0004665 A1* | 1/2004 | Kashiwa ................. 348/239 |
| 2005/0237411 A1 | 10/2005 | Watanabe |
| 2006/0066742 A1 | 3/2006 | Miyata |
| 2006/0182433 A1* | 8/2006 | Kawahara et al. ......... 396/123 |
| 2009/0073285 A1* | 3/2009 | Terashima ............ 348/231.99 |
| 2009/0147107 A1* | 6/2009 | Kawahara et al. ....... 348/240.2 |

FOREIGN PATENT DOCUMENTS

| CN | 1691754 A | 11/2005 |
| CN | 1753458 A | 3/2006 |
| JP | 2002-010133 A | 1/2002 |
| JP | 2002-010134 A | 1/2002 |

OTHER PUBLICATIONS

A Chinese Office Action (and English translation thereof) dated Jun. 27, 2008, issued in a counterpart Chinese Application.

* cited by examiner

*Primary Examiner* — Ronald Laneau
(74) *Attorney, Agent, or Firm* — Holtz, Holtz, Goodman & Chick, PC

(57) ABSTRACT

On adding a newly selectable scene selection screen to an imaging device having a shooting condition setting section which sets the imaging device for a shooting condition, upon receiving a selection of any one of scene selection screens corresponding individually to shooting scenes, by reading out the selected shooting condition corresponding to the selected shooting scene, from a storage section that stores the shooting conditions individually in association with the shooting scenes, a template composed of separate areas on each of which to display a display element being different from other display elements to be displayed on other areas is prepared, each display element is input individually to each area, and the template, to which the display elements are input, is set as the scene selection screen to be added.

14 Claims, 11 Drawing Sheets

FIG. 2A

| SCENE | | SHUTTER SPEED | F NUMBER | EV SHIFT | COLOR ENHANCEMENT | WHITE BARANCE | CHORMA | ... |
|---|---|---|---|---|---|---|---|---|
| 1 | PEOPLE | — | — | — | — | — | — | ... |
| 2 | FLOWER | — | — | — | — | — | — | ... |
| .... | .... | .... | .... | .... | .... | .... | .... | .... |

FIG. 2B

| SCENE | | TITLE | NOTE | SAMPLE IMAGE |
|---|---|---|---|---|
| 1 | PEOPLE | FOR SHOOTING PEOPLE | SKIN COLOR IS ENHANCED. SELECT TELEPHOTO POSITION FOR OPTIMALLY DEFOCUSING BACKGROUND | SAMPLE IMAGE DATA |
| 2 | FLOWER | FOR SHOOTING FLOWER | MACRO MODE IS SET WITH HIGHER CHORMA | SAMPLE IMAGE DATA |
| .... | .... | .... | .... | .... |

SCENE SELECTION SCREEN GENERATION DEVICE, SCENE SELECTION SCREEN ADDING SYSTEM, METHOD FOR GENERATING SCENE SELECTION SCREEN, METHOD FOR ADDING A SCENE SELECTION SCREEN, IMAGING DEVICE, AND COMPUTER READABLE STORAGE MEDIUM HAVING RECORDED THEREON A PROGRAM

BACKGROUND OF THE INVENTION

1. Field of the Invention

The present invention relates to a scene selection screen generation device, a scene selection screen adding system, a method for generating a scene selection screen, a method for adding a scene selection screen, an imaging device, and a computer readable storage medium having recorded thereon a program, each of which is for adding a newly selectable scene selection screen to an imaging device having a shooting condition setting section which sets the imaging device for a shooting condition, upon receiving a selection of any one of scene selection screens corresponding individually to shooting scenes, by reading out the shooting condition corresponding to the selected shooting scene, from a storage section that stores the shooting conditions individually in association with the shooting scenes.

2. Description of the Related Art

Today, digital cameras offering scene selection feature are appearing. This scene selection feature typically offers pre-registered shooting conditions (sets of values of f number, shutter speed, white balance and coloration, etc.) individually associated with and optimal for pre-set scenes, such as "landscape", "nightscape" and "people". Selection of any one of these pre-registered scenes automatically sets the camera for an optimal shooting condition associated with the selected scene. This affords scene-adapted shooting with optimal shooting condition for scenes each.

On displaying one of the scenes, "landscape", "nightscape" and "people" for example, as a pre-set sample image, a typical digital camera with such a function displays a note that says "Shooting people", "Enhance skin color" and so forth, together with the displayed sample image. A user can know easily from this, in advance, which scene to select for optimally shooting actual scenes, or, of what type the shooting condition to be applied is. In other words, the user can select one of the pre-registered scenes with sufficient understanding based on the displayed sample image and the note. This enables the user to shoot an intended scene with an optimal shooting condition (see for example, Unexamined Japanese Patent Application KOKAI Publication No. 2002-10133).

The digital camera displays the sample image and the notes therefor as a scene selection screen, one screen for each scene. When a desired scene selection screen is selected and the selection is decided, a shooting condition that is associated with the selected scene is applied.

In addition, there is an invention of a digital camera that allows registration of a shooting condition used in the user's shooting, in association with the image shot in the shooting. In this digital camera, when any image is selected from the images shot in the past, a shooting condition that is associated with the selected image is automatically applied. Therefore, a user can confirm the quality of photograph to be taken, by seeing the image shot in the past, and can perform shooting with the same shooting condition as that of the image in the user's view (see for example, Unexamined Japanese Patent Application KOKAI Publication No. 2002-10134).

However, in the digital camera of Unexamined Japanese Patent Application KOKAI Publication No. 2002-10133, when an image displayed in association with a note on the scene selection screen is replaced with another image photographed by the user himself/herself, change of shooting condition is caused together. In this time, the note is not changed, and it comes that lack of correspondence between the shooting condition and the note is caused. That is, in the digital camera of Unexamined Japanese Patent Application KOKAI Publication No. 2002-10134, the linked operation in new recording or updating is only between the shooting condition and the images. It provides a low flexibility for a user who envisions a new scene and wishes to prepare an optimal information screen (scene selection screen) therefor.

In the digital camera of Unexamined Japanese Patent Application KOKAI Publication No. 2002-10134, what the digital camera performs is to merely display the image photographed by the user himself/herself. Therefore unfortunately, it is difficult to know to what kind of a scene a shooting condition set in association with the displayed image should optimally be applied.

The present invention is made in view of the above-described conventionally existing problems, and it is an object of the present invention to realize individual user's flexible preparation of an easy-to-grasp screen for selecting a scene, in which the user can freely prepare and add a scene selection screen while associating the scene selection screen with a shooting condition to be set.

SUMMARY OF THE INVENTION

A scene selection screen device according to a preferable embodiment of the p resent invention comprises:

a template storage section that stores a template composed of separate areas on each of which to display a display element being different from other display elements to be displayed on other areas;

an input control section that controls input of display elements so that each display element is input individually to each area of the template stored in the template storage section;

a scene selection screen setting section that sets, as a scene selection screen, the template to which the display elements are input by the input control section; and a shooting condition adding section that associates the scene selection screen set by the scene selection screen setting section with a shooting condition.

A scene selection screen adding system according to a preferable embodiment of the present invention is a scene selection screen adding system for adding a newly selectable scene selection screen to an imaging device having a shooting condition setting section which sets the imaging device for a shooting condition, upon receiving a selection of any one of scene selection screens corresponding individually to shooting scenes, by reading out a shooting condition corresponding to the selected shooting scene, from a storage section that stores the shooting conditions individually in association with the shooting scenes, the scene selection screen adding system comprising:

a template storage section that stores a template composed of separate areas on each of which to display a display element being different from other display elements to be displayed on other areas;

an input control section that controls input of display elements so that each display element is input individually to each area of the template stored in the template storage section;

a scene selection screen setting section that sets, as the scene selection screen to be added, the template to which the display elements are input by the input control section;

a shooting condition adding section that associates the scene selection screen set by the scene selection screen setting section;

a display order setting section that sets a display order in which the scene selection screen set by the scene selection screen setting section is displayed;

an adding section that adds the scene selection screen set by the scene selection screen setting section so that the scene selection screens are displayed in the order set by the display order setting section, without causing any change in a display order among the preciously prepared scene selection screens, when the imaging device displays the scene selection screen.

A method for generating a scene selection screen according to a preferable embodiment of the present invention comprises:

an input control step of controlling input of display elements so that each display element is input individually to an area of a template composed of separate areas on each of which to display a display element being different from other display elements to be displayed on other areas;

a scene selection screen setting step of setting, as a scene selection screen, the template to which the display elements are input in the input control step;

a shooting condition adding step of associating the scene selection screen set in the scene selection screen setting step with a shooting condition.

A method for adding a newly selectable scene selection screen to an imaging device having a shooting condition setting section which sets the imaging device for a shooting condition, upon receiving a selection of any one of scene selection screens corresponding individually to shooting scenes, by reading out a shooting condition corresponding to the selected shooting scene, from a storage section that stores the shooting conditions individually in association with the shooting scenes, the method comprising:

an input control step of controlling input of display elements so that each display element is input individually to each area of the template composed of separate areas on each of which to display a display element being different from other display elements to be displayed on other areas;

a scene selection screen setting step of setting, as the scene selection screen to be added the template, to which the display elements are input in the input control step;

a shooting condition adding step of associating the scene selection screen set in the scene selection screen setting step with a shooting condition;

a display order setting step of setting a display order in which the scene selection screen set in the scene selection screen setting step is displayed;

an addition step of adding the scene selection screen set in the scene selection screen setting step so that the scene selection screens are displayed in the order set in the display order setting step, without causing any change in a display order among the preciously prepared scene selection screens, when the imaging device displays the scene selection screen.

An imaging device according to a preferable embodiment of the present invention is an imaging device having a shooting condition setting section which sets the imaging device for a shooting condition, upon receiving a selection of any one of scene selection screens corresponding individually to shooting scenes, by reading out a shooting condition corresponding to the selected shooting scene, from a storage section that stores the shooting conditions individually in association with the shooting scenes, the imaging device comprising:

a template storage section that stores a template composed of separate areas on each of which to display a display element being different from other display elements to be displayed on other areas;

an input control section that controls input of display elements so that each display element is input individually to each area of the template stored in the template storage section;

a scene selection screen setting section that sets, as a scene selection screen, the template to which the display elements are input by the input control section;

a shooting condition adding section that associates the scene selection screen set by the scene selection screen setting section with a shooting condition.

A computer-readable storage medium according to a preferable embodiment of the present invention has a program recorded thereon to cause a computer to execute:

an input control process of controlling input of display elements so that each display element is input individually to an area of a template composed of separate areas on each of which to display a display element being different from other display elements to be displayed on other areas;

a scene selection screen setting process of setting, as a scene selection screen, the template to which the display elements are input in the input control process;

a shooting condition adding process of associating the scene selection screen set in the scene selection screen setting process with a shooting condition.

According to the present invention, it is possible to realize individual user's flexible reparation of an easy-to-grasp screen for selecting a scene, in which the user can freely prepare and add a scene selection screen while associating the scene selection screen with a shooting condition to be set.

BRIEF DESCRIPTION OF THE DRAWINGS

These objects and other objects and advantages of the present invention will become more apparent upon reading of the following detailed description and the accompanying drawings, in which:

FIG. 2A is a diagram showing the details of sets of shooting conditions associated with the scenes recorded on the digital camera;

FIG. 2B is a diagram showing the contents of data of additional information stored in association with corresponding scenes stored in the digital camera;

DETAILED DESCRIPTION OF THE PREFERRED EMBODIMENTS

The following describes the embodiments of the present invention with reference to the drawings. A scene selection screen adding system of the present invention is constituted by a personal computer (hereafter referred to as "PC") and a digital camera serving as an imaging device, which are interconnectable via respective I/O ports.

Figure 1:
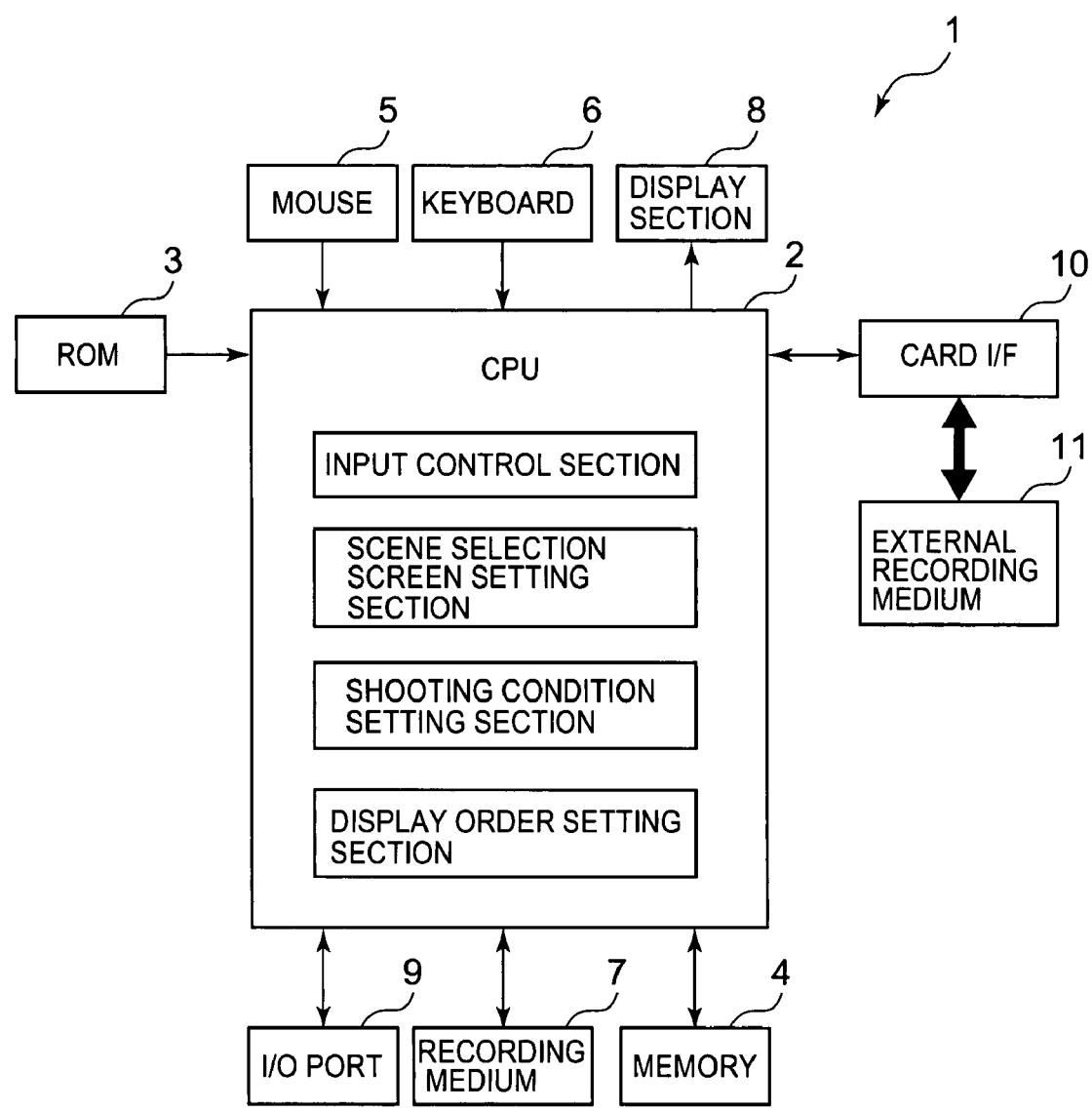
FIG. 1 is a block diagram showing a personal computer according to a first embodiment of the present invention.

FIG. 1 is a block diagram showing a schematic illustration of the electric structure of a PC 1. The PC 1 comprises a CPU 2, a ROM 3, a memory 4, a mouse 5, a keyboard 6, a recording medium 7, a display section 8, an I/O port 9, and a card I/F 10. An external recording medium 11 and detachably attached to a card slot of the PC, which is not shown, is connected to the card I/F 10.

The CPU 2 can perform various digital signal processing, including compression and decompression of image data, and controls each section of PC 1. Particularly, the CPU has a function of preparing a setup file that makes it possible to select a scene of new kind, which is described later. The ROM 3 stores a control program and data which are needed for the control of each part. The CPU 2 operates under the program. Particularly, ROM 3 stores an executable file that corresponds to a program for preparing a setup file.

The memory 4 is a buffer memory for temporarily storing various data, and is used as a working area of the CPU 2. The mouse 5 and the keyboard 6 include various operation keys and send operational signals generated according to the key operation, to the CPU 2. The recording medium 7 is an internal memory which stores data, as exemplified by a hard disk, a nonvolatile memory or the like. The display section 8 includes a color LCD and a drive circuit therefor and displays an image.

The I/O port 9 inputs/outputs data, between the PC 1 and an external electronic device (for example, a digital camera serving as an imaging device), and can perform input/output in USB (Universal Serial Bus) standard, IEEE1394 standard and other various interface standards. That is, the I/O port 9 is structured so as to be connectable to electronic devices, such as a digital camera, which is capable of inputting/outputting data subject to these standards. Further, the I/O port 9 may input/output data of image files by an infrared communication based on IrDA standard, or Bluetooth-based wireless communication, to/from an external electronic device.

The card I/F 10 allows input/output of data between the PC 1 and an external recording medium 11. That is, the CPU 2 can read out data recorded on the external recording medium 11 and record data recorded in the recording medium 7 to the external recording medium 11, via the card I/F 10.

Figure 9:
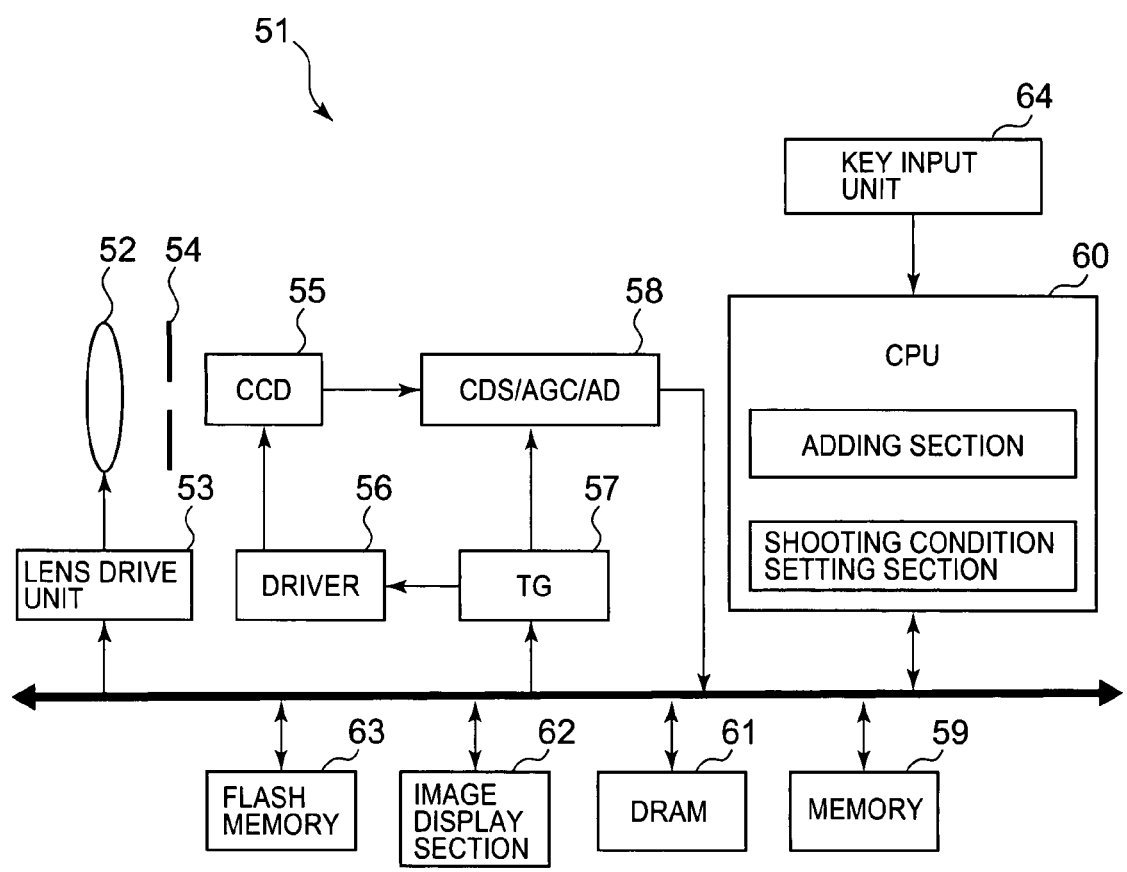
FIG. 9 is a block diagram showing a diagrammatic representation of the electric structure of the digital camera.

FIG. 9 is a block diagram showing a schematic representation of electric structure of a digital camera 51 which is connectable to the PC 1 via the I/O port 9 thereof. The digital camera 51 comprises a shooting lens 52, a lens drive unit 53, a shutter-diaphragm 54 with aperture setting function, a CCD 55, a driver 56, a TG (timing generator) 57, a unit circuit 58, a memory 59, a CPU 60, a DRAM 61, an image display section 62, a detachable flash memory 63, a key input section 64 and a bus 65.

The shooting lens 52 comprises a focus lens, a zoom lens and the like which are constituted by a lens group having a plurality of not-shown lens. To the focus lens and the zoom lens, a lens drive unit 53 is connected (diagrammatic representation therefor is omitted). The lens drive unit 53 comprises a motor (not shown) that moves the focus lens and zoom lens individually in the optical axis direction and a motor driver (not shown) that drives the focus motor and the zoom motor individually in accordance with a control signal sent from the CPU 60.

The shutter-diaphragm 54 includes a not-shown drive circuit. This drive circuit causes the shutter-diaphragm 54 to operate in accordance with a control signal sent from the CPU 60. This shutter-diaphragm 54 acts as a shutter and a diaphragm. Here diaphragm refers to a mechanism that controls the amount of light entering from the shooting lens 52, and a shutter means refers to a mechanism for controlling a time to illuminate the CCD 55. A time to illuminate the CCD 55 (exposure time) varies dependent upon the speed of open and close of a shutter (shutter speed). The exposure of the CCD 55 varies dependent upon the state of the diaphragm and the shutter speed.

An image sensor, such as a CCD and a CMOS (here the CCD 55) is driven by the driver 56 to perform scan, performs an opt-electric conversion by which values of intensity of light in each of RGB values of a photo-object image is converted to a signal, and outputs it as an imaging signal to the unit circuit 58. The timings of operation of the driver 56 and unit circuit 58 are controlled by the CPU 60 by means of TG57. The CCD 55 comprises a color filter of Bayer arrangement and also provides a function of an electronic shutter. The shutter speed of the electronic shutter is controlled by the CPU 60 via the driver 56 and TG57.

The TG57 is connected to the unit circuit 58. The unit circuit 58 comprises: a CDS (Correlated Double Sampling) circuit that performs correlated double sampling of an imaging signal output from the CCD 55 and retains the sampled imaging signal; an AGC (Automatic Gain Control) circuit that performs automatic gain control of the sampled imaging signal, an A/D converter that converts automatically the gain-controlled analog imaging signal into a digital signal. The imaging signal of the CCD 55 is sent to the CPU 60 as a digital signal via the unit circuit 58.

The CPU 60 is a one-chip micro computer having the function of performing image processing, such as gamma correction, interpolation, white balance adjustment, generation of a luminance/chrominance signal (YUV data), on the image data sent from the unit circuit 58, compression and decompression of the image data. The CPU 60 further has a function of controlling each section of digital camera 51. The CPU 60 includes a clock circuit, and has a function of a timer. Particularly, in this embodiment, the CPU 60 has a scene selection function, which automatically sets a shooting condition that is associated with a scene, when the scene is selected. That is, the CPU 60 also serves as a section for setting a shooting condition.

The memory 59 stores control programs needed for the control of each section of the CPU 60 and data needed therefor (e.g. a table of correction coefficient). The CPU 60 is managed by the program. The memory 59 also has a storage area for storing information needed for the present invention. The DRAM 61 is used as a buffer memory for temporarily storing image data that is sent to the CPU 60 after being imaged by the CCD 55. Further, the DRAM 61 is used as a working memory of the CPU 60.

The image display section 62 includes a color LCD, which serves as an electronic view finder and a drive circuit for driving the same. In a shooting standby mode, the image display section 62 displays a photo-object imaged by the CCD65 as a through image. Further, on reproducing a recorded image, the image display section 62 displays a recorded image read out from the flash memory 63 and decompressed. The flash memory 63 is a recording medium for saving image data imaged by the CCD 55.

Figure 10:
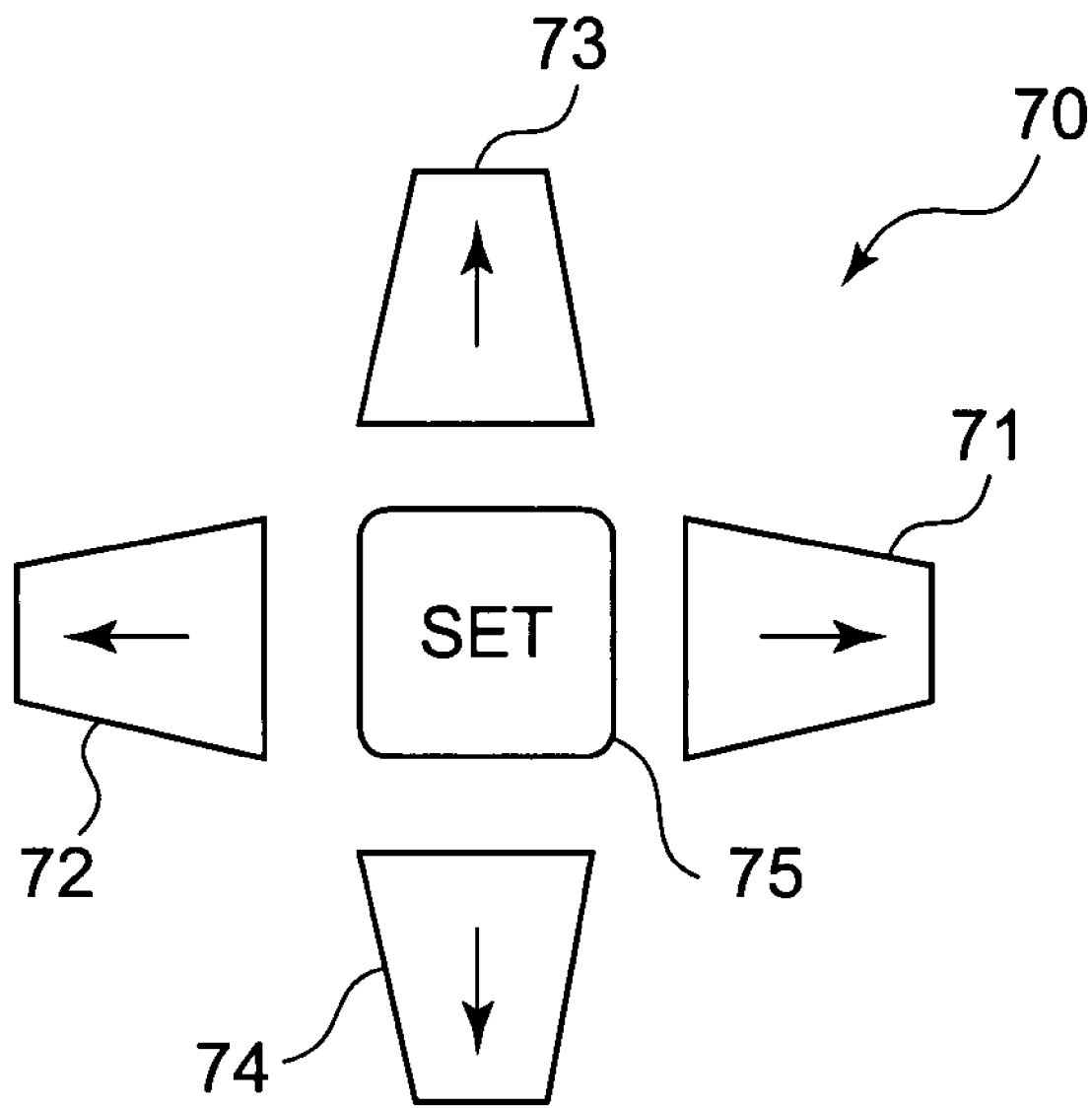
FIG. 10 is a diagram for explaining a cross key.

The key input section 64 includes a plurality of control keys, including a power button, a shutter button, a BS (Best Shot) mode button, a mode switch key, a menu key, a zoom key, and a cross key, and outputs a control signal in accordance with the key operation performed by a user, to the CPU 60. The zoom key includes "W" key, "T" key, and the like. Further, as shown in FIG. 10, the cross key 70 comprises "→" key 71, "←" key 72, "↑" key 73, "↓" key 74, and a "SET" key 75.

The following several paragraph provide general overview of this embodiment. The embodiment is illustrated as an imaging device such as a digital camera 51 that has a scene selection function in which easy setting of a shooting condition that is associated with a scene is enabled by selecting the scene. A setup file, which is for setting up a scene of a new kind in the scene selection function is prepared by PC 1 or any suitable device in advance. Based on the prepared setup file, the setup is performed so that a scene of new kind can be selected in the digital camera.

Firstly, an explanation is given of the scene selection function in the digital camera 51. In the memory 59 of the digital camera 51, shooting condition data (values off number, shutter speed, white balance and coloration) is stored in association with the corresponding scene in advance. Further, a title of a scene, an explanation regarding a shooting operation of the digital camera at the time of shooting and the image quality of the image to be shot in the shooting (hereafter referred to as "note") are stored in association with the respective scenes, and data of additional information including a sample image are stored. Each scene is numbered.

When the scene selection function is activated, scene selection screens each including, for example, a sample image, a title thereof and a note of each scene are displayed on the image display section 62 for each scene, sequentially. When a user selects a desired scene selection screen via the key input section 64, a shooting condition that is associated with the selected scene selection screen is automatically set.

FIG. 2A illustrates a contents of a shooting condition. For each scene, a shutter speed, f number, EV shift (exposure compensation), color enhancement and the like are stored. FIG. 2B illustrates the details of data of additional information. For each scene, a title that describes the details of the scene, which reads for example, "For people shooting", a note that reads "Skin color is enhanced. Select telephoto position for optimally defocusing background", and a sample image are stored for each scene.

By comparing the above-described titles, notes and sample images of the scenes displayed on the scene selection screen with each other, among scene selection screens, a user can easily select an optimal scene for shooting a subject under a certain condition. This provides scene-adapted shooting with shooting condition optimal for the scene to be shot.

The above-described scene selection function is started, for example, by the press-down of a BS mode button of the digital camera 51. Then, a scene selection screen associated with a predetermined scene is displayed on an electronic view finder of the digital camera 51. It is possible to sequentially switch the scene selection screen to another one associated with another scene, by performing a predetermined key operation in the digital camera. The scene selection screens are displayed in the order of the numbers added individually to the scenes. A number selected in a previous time may be memorized as it is, and the scene selection screen associated with the memorized number may be displayed on the activation of the scene selection function.

Figure 3A:
FIG. 3A is a diagram showing the scene selection screen displayed on the digital camera.

FIG. 3A shows a displayed scene selection screen. On the scene selection screen, a sample image associated with a predetermined scene, a scene title and a note are displayed. Further, data of additional information associated with the scene is displayed. The number corresponding to the displayed scene is displayed in the upper right corner.

During the displaying of the scene selection screen, when a user operates "→" key 71 in a cross key of the digital camera 51, a scene selection screen associated with the next number is displayed. When the user operates any key, for example "←" key 72, a scene selection screen associated with the previous number is displayed. When the user operates "W" key of a zoom key during the display of any scene selection screen, an image list screen having a grid of a predetermined number of sample images stored in association with the respective scenes is displayed.

Figure 3B:
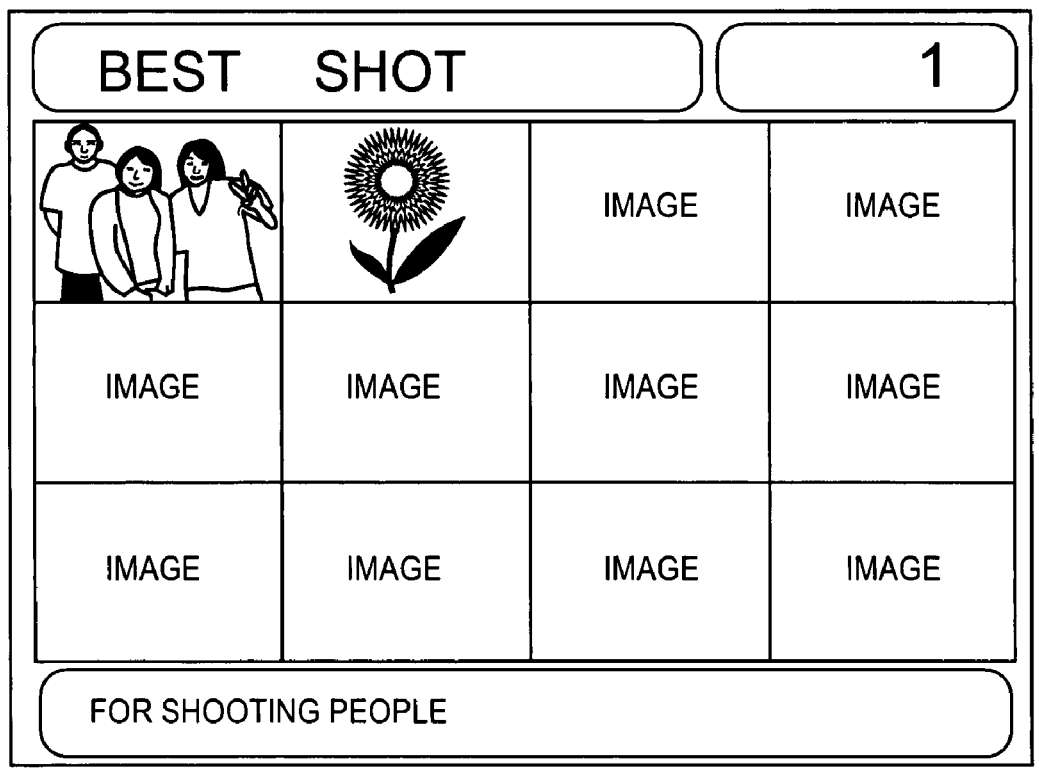
FIG. 3B is a diagram showing a table of sample images displayed on the digital camera.

FIG. 3B shows the sample images associated with the respective scenes and displayed in the image list screen. The sample images are displayed, for example, in groups of 12 so that a first group includes the images of scene numbers 1 to 12 and a second group includes the images of scene numbers 12 to 24. Each group is displayed in each image list screen. A user can switch the image list screens each including twelve sample images to another sequentially, by performing a predetermined key operation of the digital camera. After the shift to the image list screen from the scene selection screen, at the beginning, an image list screen including the sample image that corresponds to the image which has been displayed in the scene selection screen, is displayed. The displaying is such that, in the image list screen, the user can notice a corresponding image of the scene selection screen that has been displayed. For example, the sample image is outlined by a bold border. At this time, a scene title associated with the noticeably displayed sample image may be displayed. In the example of FIG. 3B, the first sample image is made noticeable, and thus the scene title associated with the first sample image is displayed below the grid of images in the image list screen.

When the user operates, for example, "→" key 71 of the cross key of the digital camera during the displaying of the image list screen, a sample image associated with the next number is noticeably displayed. By the operation of "←" key 72, a sample image associated with the previous number is noticeably displayed. Further, during the display of any sample image, when the user operates "T" key of the zoom key, the screen shifts to a scene selection screen associated with the noticeably displayed sample image.

In this way, in a state where a desired scene selection screen is displayed or a desired sample image is noticeably displayed in the image list screen, "SET" key of the digital camera is operated, a shooting condition that is associated with the displayed scene selection screen or the noticeably displayed sample image is automatically set, and the user can shoot a photo-object with the set shooting condition.

The present invention is for allowing a user to set a digital camera for a scene of a new kind; here the scene refers to such a scene for which a shooting condition is automatically set in accordance with the scene setting screen and the image list screen.

Here, a brief explanation is given of the operation of a shooting scene set up system. Firstly, data of additional information that is to be associated with a scene, which a user wish to add, is set in the process of preparing a scene selection screen that is to be associated with the scene the user wishes to add, on the PC 1. Next, the set data of additional information, namely the prepared scene selection screen, is associated with a corresponding shooting condition, and a setup file that can be set in the digital camera 51 is generated. Then, in the digital camera 51, setting-up is performed so that a scene of a new kind can be selected in accordance with the generated setup file.

The following describes the operation for preparing a setup file in the PC 1; an explanation is given, regarding the setting of data of additional information, which is associated with a new scene to be selectable, while a separate explanation is given, regarding the process of associating the data of additional information and its corresponding shooting condition. Finally, a description is given of the setting up based on the setup file, which is prepared on the PC 1, on the digital camera 51.

Figure 4:
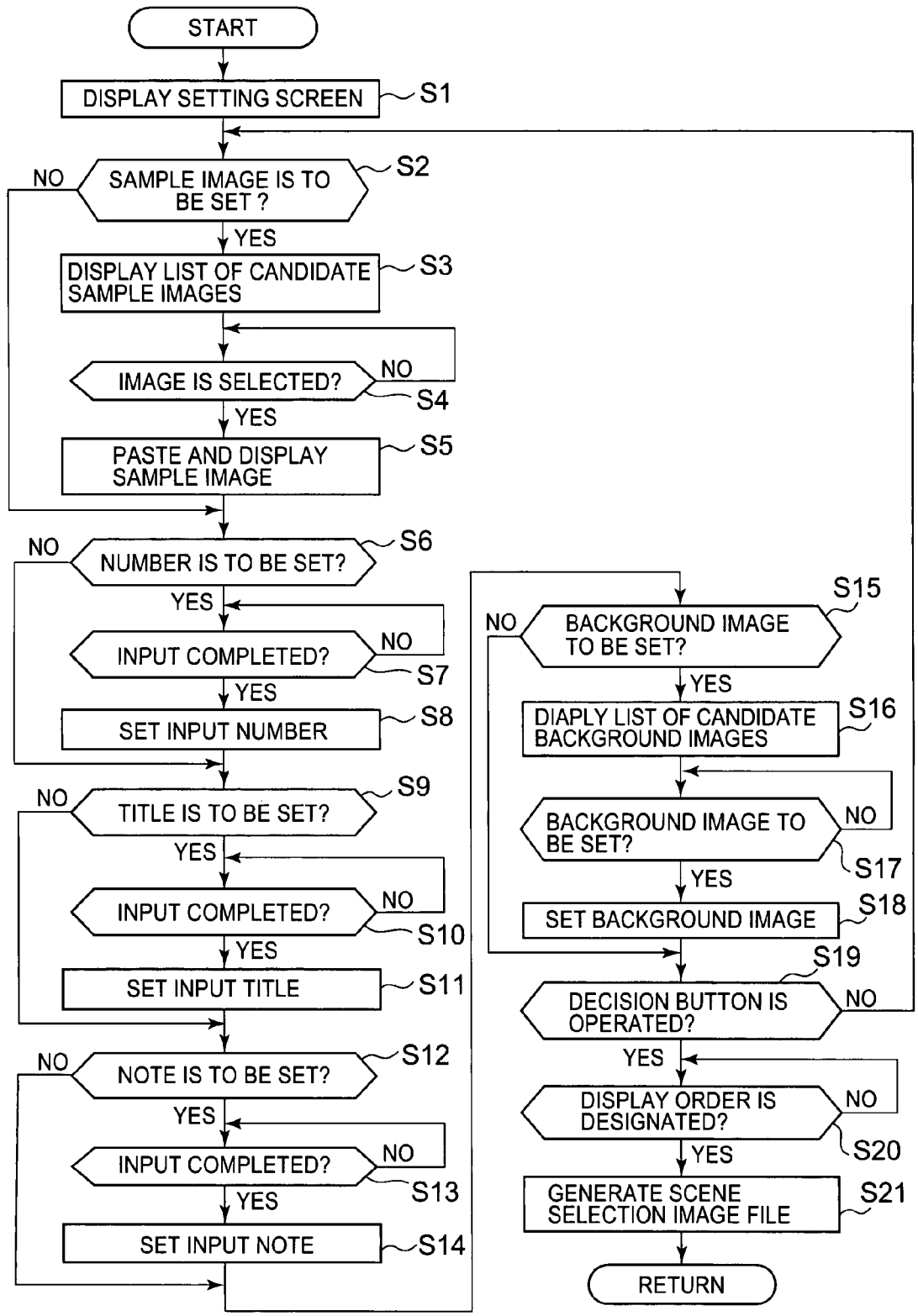
FIG. 4 is a flowchart showing an operation for setting data of additional information.

An operation for setting data of additional information is explained in accordance with the flowchart of FIG. 4. In PC 1, when a program for preparing the setup file is activated, the CPU 2 displays a screen for setting the data of additional information on the display section 8 (step S1).

Figure 5A:
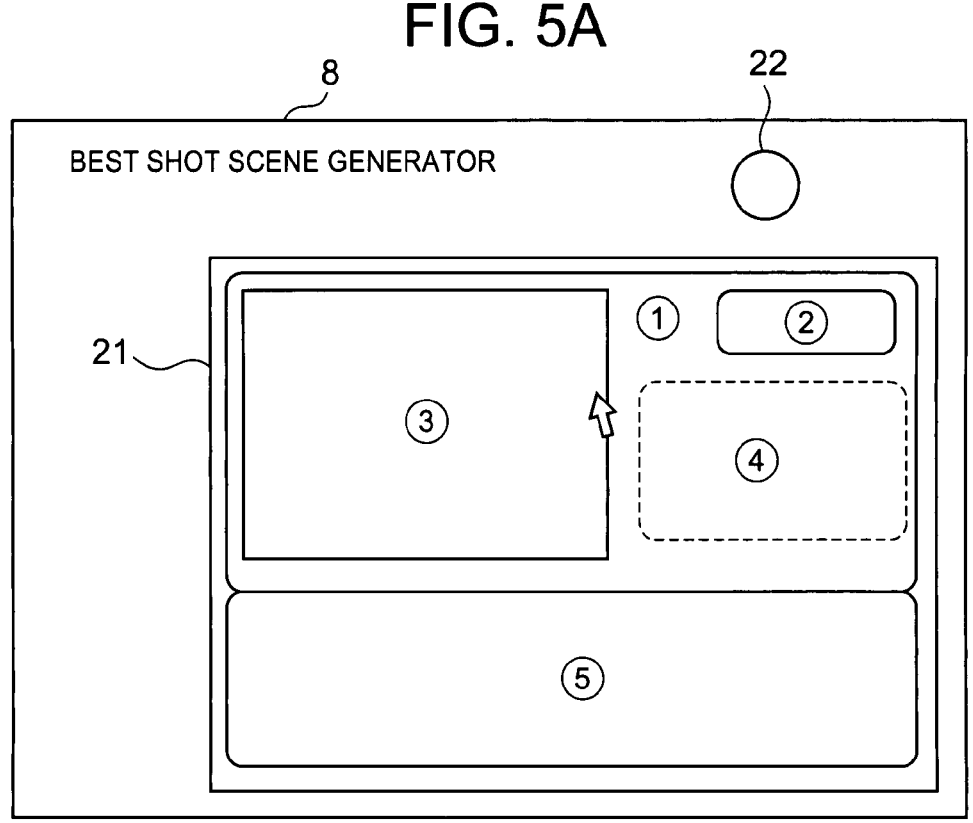
FIG. 5A is a diagram showing a screen for setting data of additional information.
Figure 5B:
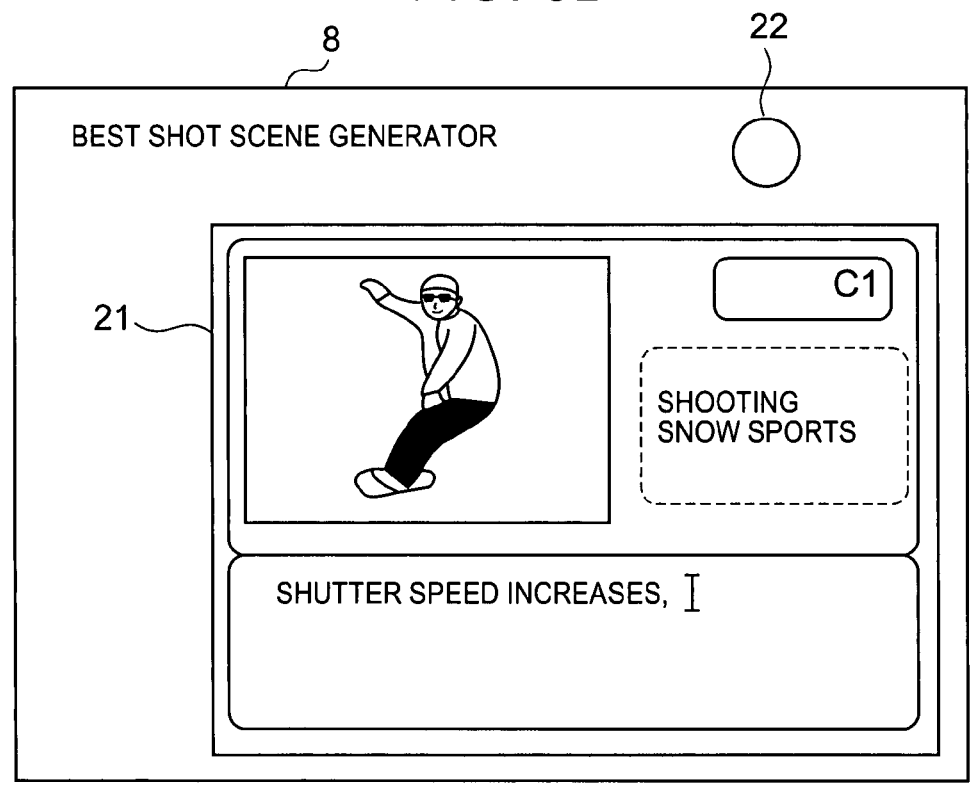
FIG. 5B is a diagram showing a screen for setting data of additional information.

FIG. 5A and FIG. 5B show the screen in this operation. On the display section 8, a scene selection screen sample 21 as a template, and a decision button 22 for confirming the entry of the set data of additional information, is displayed. Here, the scene selection screen sample 21 is displayed as a sample of a scene selection screen to be displayed on the digital camera. As will be described later in greater detail, when the entries of the additional information is confirmed, the scene selection screen sample 21 having been completed in the process of setting the additional information is confirmed as a scene selection screen to be displayed on the digital camera, by decision button 22 being operated.

The scene selection screen sample 21 has an area 2 for displaying "scene number" set as the data of additional information ("display elements"), an area 3 for displaying "sample image", an area 4 for displaying "scene title", an area 5 for displaying "note" and an area 1, which is other than areas 2-4, for displaying "background image". In other words, a scene number, a sample image, a scene title and a background image are displayed as display elements, in the later-described manner. As previously described, the note includes the note on the shooting operation of the digital camera at the time of shooting, and the note on the image quality of the image obtained on the shooting.

Next, the CPU 2 determines whether or not to perform selection and setting of a sample image, as data of additional information (step S2). This is determined based on whether the user has moved a cursor to the area 3 for displaying the sample image and clicked the image by the operation of the mouse 5 or the keyboard 6.

In the case where it is determined in step S2 to newly perform the selecting and setting of a sample image, the CPU 2 displays as a list the image data recorded on the recording medium or the external recording medium 11 (the data may be the title of the image data, or a thumbnail thereof) as candidates for the sample image, on the display section 8 (step S3).

Then, the CPU 2 determines whether any image data is selected as a sample image by the user from the listed image data (step S4). In this time, the user can select image data or an image file the user wishes to select as a sample image, by operating the mouse 5 or the keyboard 6, with the listed image data in the user's view. The image data and the image file recorded on the recording medium 7 and the external recording medium 11 are not limited to the image data or an image file shot by the digital camera 51, and any image data or image file which the user prepares and edits on the PC 1 may be used. Further, any downloaded image data or image file can be used. That is, whatever is image data or an image file may be used.

The operation does not proceed from S4 till it is judged that any image data or image file is selected for the sample image. Then, when it is judged in step S4 that any image data or image file is selected as the sample image, the CPU 2 generates an image based on the selected image data or the image file, and sets the image in the additional information as the sample image thereof. Then, the set sample image is pasted on the area 3 of the scene selection screen sample 21 and the scene selection screen with the sample image is displayed (step S5), and the flow proceeds to step S6. In this time, the CPU 2 stores information showing the location of the image data or the image file selected as the sample image to an image location information storage area of the memory 4.

On the other hand, in step S2, when it is not determined to perform the selecting and setting of sample image, the flow proceeds to step S6 without any further operation. In step S6, the CPU 2 determines whether to set a scene number, which is an element to be set as the data of additional information. The determination is made based on whether the cursor is moved to the area 2, in which the scene number is to be displayed, by the operation of the mouse 5 or the keyboard 6 by the user, and whether any click operation has been done. When the cursor is moved to the area 2 and the click operation is done, area 2 is turned into a state in which texts can be input. Then the user can input the number by the operation of the keyboard 6.

In step S6, when it is determined to newly perform setting of scene number, the CPU determines whether the input of the number has been completed (step S7). The determination is made based on whether any operation signal that correspond to the operation of the return key of the keyboard 6 is sent from the keyboard 6. The user can input the number by operating the keyboard 6 and operates the return key when the user judges that there is no problem in determining the input number.

When it is determined in step S7 that the input of number has not been completed, the process do not proceed from step S7 till completion. Then, when it is determined in step S7 that the inputting of the number has been completed, the CPU 2 sets the input number as the scene number of the data of additional information (step S8) and the flow proceeds to step S9. The set scene number is displayed on the area 2. Here, to avoid duplication of number between the set scene number and any one of the scene numbers associated with the other scene selection screens previously stored in the digital camera, the input screen number with capital letter C is set. In the illustration of FIG. 5B, the user has input the number "1", the number to be set is "C1". Further, the CPU 2 stores the input number just before the setting (before the addition of capital letter C) in a number storage area of memory 4.

On the other hand, when it is determined in step S6 that the setting of scene number is not performed, the flow proceeds to step S9 without any further operation. In step S9, the CPU 2 determines whether to perform setting of the scene title of the data of additional information. The determination is made based on whether the cursor is moved to the area 4 for displaying the scene title, by the user's operation of the mouse 5 or the keyboard 6, and whether any click operation has been done. When the cursor is moved to the area 4 and a click operation is performed, the area 4 comes to a state in which texts can be input, and the user can input sentences by operating the keyboard 6.

When it is determined in step S9 the setting of the scene title is newly performed, the CPU 2 determines whether the inputting of the title (a sentence) has been completed (step S10). The determination is made based on whether an operation signal that corresponds to the operation of the return key of the keyboard 6 is sent from the keyboard 6. The user can input sentences by operating the keyboard 6, and if the user thinks there is no problem in confirming the input title, he/she operates the return key.

The operation does not proceed from step S10 till it is determined that the input of scene title has been completed. Then, when in step S10 it is determined that the input of the scene title has been completed, the CPU 2 sets the input scene title as the scene title of the data of additional information (step S11), and the flow proceeds to step S12.

The set scene title is displayed in the area 4. Then, in the illustration of FIG. 5B, the user has input "Shooting snow sports", and the input sentence is set as the scene title. In this time, the CPU 2 stores the sentence to be set as the scene title in a title storage area of the memory 4.

On the other hand, when it is determined in step S9 that the input of the scene title is not performed, the flow proceeds to step S12 without any further operation. In step S12, the CPU 2 determines whether to perform the setting of a note of the data of additional information. The determination is made based on whether the cursor is moved to the area 5 for displaying the note, by the user's operation of the mouse 5 or the keyboard 6, and whether the click operation has been done. When the cursor is moved to the area 5 and the click operation is done, the area 5 comes to a state in which texts can be input, and the user can input sentences by operating the keyboard 6.

When it is determined in step S12 that the setting of note is newly performed, the CPU 2 determines whether the input of note (a sentence) has been completed (step S13). The determination is made based on whether an operation signal that corresponds to the operation of the return key of the keyboard 6 is sent from the keyboard 6. The user can input sentences by operating the keyboard 6, and when the user thinks there is no problem in confirming the input note, he/she operates the return key.

FIG. 5B shows the screen being displayed on the display section 8 during the new input of note. Here, the area 5 is in the state in which texts are input, and a particle of sentence that reads "Shutter speed increases," has been input. In the area 3, the sample image set in step S5 is displayed, and in area 2, scene number of "C1" set in step S8 is displayed. Further, in the area 4, the words that read "Shooting snow sports", which is set in step S11 is displayed as a title.

When it is determined in step S113 that the input of the note has not been completed, the flow do not proceed from step S13 till completion. Then when it is determined in step S13 that the input of note has been completed, the CPU 2 sets the input note as the note of the data of additional information (step S14), and the flow proceeds to step S15. The confirmed note is also displayed in the area 5. In this time, the CPU 2 stores the sentence set as the note to a note storage area of the memory 4.

On the other hand, when it is determined in step S12 that the setting of note is not performed, the flow proceeds to step S15 without any further operation. In step S15, the CPU 2 determines whether to perform setting of background image of the scene selection screen in the data of additional information. The determination is made based on whether the cursor is move to the area 1 (in scene selection screen sample 21, an area other than the areas 2-5) by the operation of the mouse 5 and any click operation is performed.

Then, in step S15, when it is determined that the setting of the background image is performed, the CPU 2 controls the display section 8 to display a plurality of background images based on the background image data or the background image file recorded on the ROM 3 (step S16).

Next, the CPU 2 determines whether any one is selected from the listed background images by the user (step S17). In this time, a user can set any image which the user wishes to display as a background image of the scene selection screen, by operating the mouse 5 while observing the displayed listed background images.

In step S17, when it is determined that no background image has been selected, the flow does not proceed from step S17 till it is determined that the background image is selected. Then, in step S17, when it is determined that a background image is selected, the CPU 2 sets the selected background image as the background image of the data of additional information (step S18), and the flow proceeds to step S19. In this time, the CPU 2 stores information indicating the location of the set background image data or a background image file, to a background data location storage area of the memory 4.

On the other hand, in step S15, when it is determined that the setting of the background image of the scene selection screen is not performed, the flow proceeds to step S19 without any further operation. In step S19, it is determined whether to confirm the setting of the data of additional information, in which the sample image, the scene number, the scene title, the note, and the background image are individually set. Or, it is determined whether to confirm the scene selection screen sample 21, which is completed in the process of setting the elements, as a scene selection screen. This determination is made based on whether the cursor is moved on the decision button 22 by the user's operation of the mouse 5 or the keyboard 6 and any click operation is performed.

In the case where it is not determined in step S19 that the data of additional information or the scene selection screen sample is confirmed, the flow returns to step 2. That is, it is possible to freely change or newly set, the sample image, the scene number, the scene title, the note and the background image, till the decision button 22 is clicked.

In step S19, when it is determined that the set data of additional information is confirmed, in other words, when it is determined that the decision button 22 is operated, the CPU 2 determines whether an ordinal rank for displaying the scene selection screen prepared based on the confirmed data of additional information, in the scene selection function is designated (that is, the ordinal rank in which the scene selection screen is displayed, when set up on the digital camera 51) (step S20). In this time, the CPU 2 causes the display section 8 to display a display order designation screen for designating display order on, and the user can designate the display order while observing the display order designation screen.

Figure 6A:
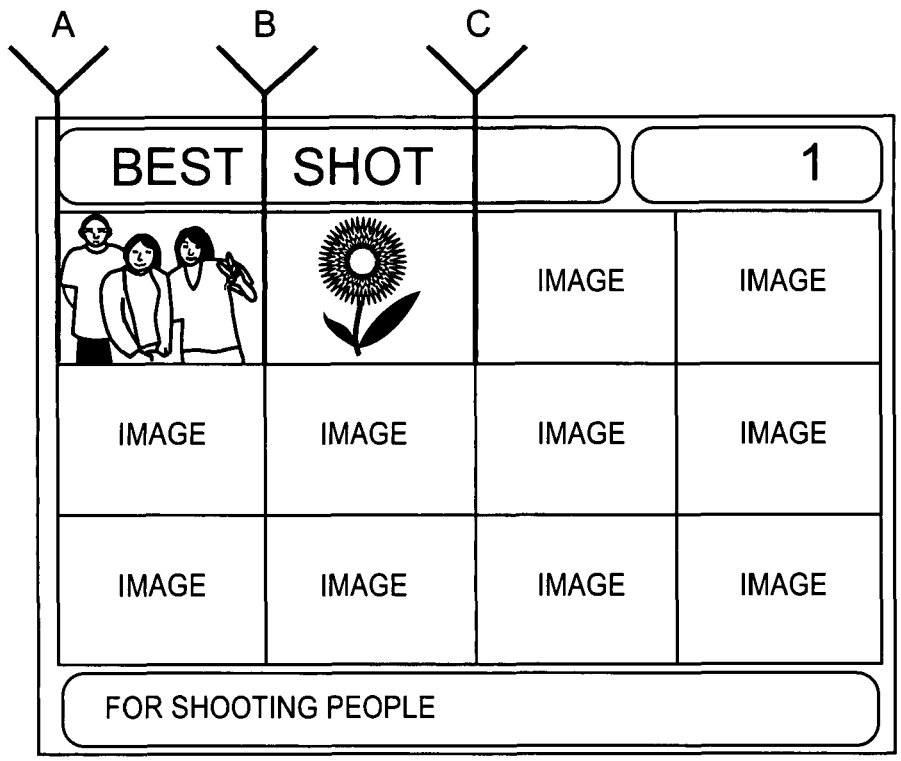
FIG. 6A is a diagram for explaining the display order.
Figure 6B:
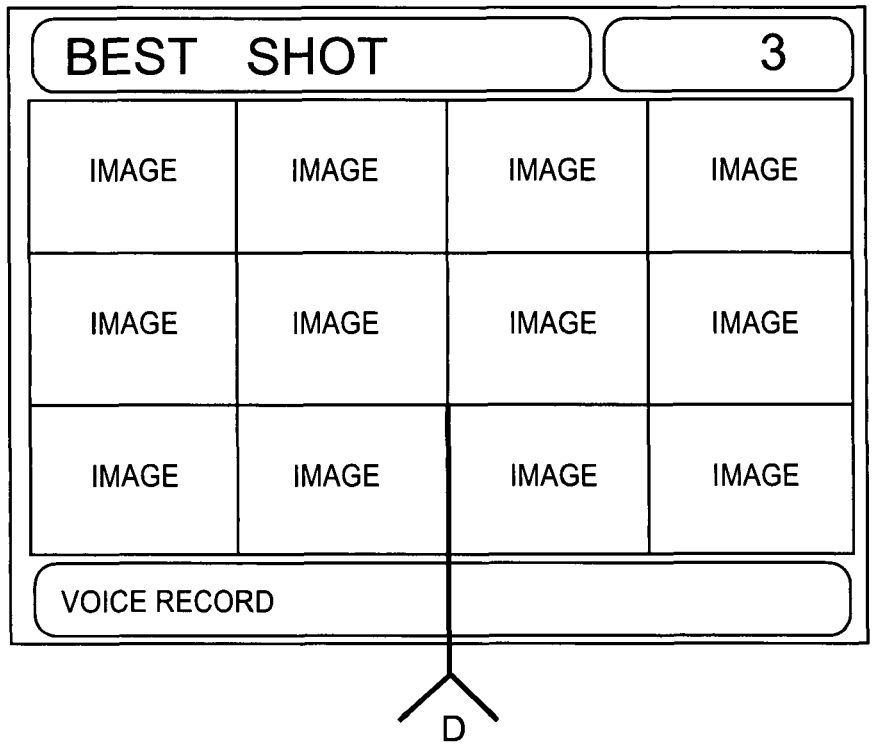
FIG. 6B is a diagram for explaining the display order.

The examples of the display order designation screen are shown in FIGS. 6A and 6B. In the display order designation screen, sample images associated with selectable scenes preset in the digital camera, are displayed in a matrix or an array which accord to an order in which the scene selection screens that are associated with the selectable scenes are to be displayed. In the display order designation screen, a position into which a scene selection screen can newly be inserted is between the sample images associated with the already set scene selection screens. Indicators with respective subtitles, using for example the symbols "A" to "D", indicate the positions that allow the insertion. The user designates the display order by designating any of symbols "A" to "D".

More specifically, when a scene selection screen is inserted to the position indicated by symbol "A" in FIG. 6A, the order in which the scene selection screen is displayed is before that of the scene selection screen that is associated with the scene number 1. In other words, according to the indicator with subtitle "A", the display order of the scene selection screen to be inserted to the position is the first. Further, the position indicated by symbol "B" corresponds to the display order between the scene selection screen corresponding to scene number 1 and the scene selection screen corresponding to the scene number 2. Further, the position of "C" shows the display order between the scene selection screen corresponding to scene number 2 and one corresponding to scene number 3. Further, in FIG. 6B, the symbol "D" indicates the display order after the scene selection screen of the last scene number. That is, according to "D", the display order is be the last.

In the case where it is determined in step S20 that the ordinary rank of displaying as not been designated, the operation does not proceed from step S20 till the designation is made. Then, in step S20, when it is determined that the display order has been designated, the CPU 2 rebuilds an image of the scene selection screen, based on: image data (sample image) indicated by information of the location of image data or an image file, the information being stored in the image location information storage area; the umber stored in the number storage area; the title stored in the title storage area; the note stored in the note storage area; and the background data (background image) indicated by information of location of background image data or the background image file, the information being stored in the background data location storage area. Together, the CPU converts the rebuilt image data into JPEG format, and a scene selection image file is generated thereby (step S21). Then, the generated scene selection image file is stored in one folder, named for example BS folder, in the recording medium 7. In this time, the name of scene selection image file to be recorded is determined in accordance with the number stored in the number storage area and the symbol designated in step S20.

For example, when the number stored in the number storage area is "1" and the designated symbol is "A", the filename of the scene selection image file to be recorded is "CEXA0001". Of these characters, "CEX" is used commonly among each file, and the subsequent portion of "CEX" is the designated symbol; here "A". One number of four digits follows it. This number is a four-digit expression of the number stored in the number storage area. In this expression, number "1" stored in the number storage area is "0001". Giving another example, when the number stored in the number storage area is "3" and the designated symbol is "D", the filename of the selection image file is "CEXD0003". In such a case where a BS folder does no exist in the recording medium 7, the CPU 2 generates the BS folder.

Next, an explanation is given of the establishment of an association between data of additional information (a scene selection image file based on the data of additional information) and a corresponding shooting condition. A parameter image file, which is be associated with one scene selection screen (a scene selection image file generated as described above) is stored in the BS folder by the user, on the generation of the setup file, previously. The shooting condition of the previously stored parameter image file and the scene selection image file are associated with each other, and thereby the setup file is generated. The parameter image file contains various shooting condition information at the time of shooting the image of the parameter image file, and identification information for identifying the digital camera that shot the image. Thus, these information is utilized.

Here, it is possible to record the image file shot by a digital camera to the recording medium 7 through the external recording medium 11, as a parameter image file. Or, it is possible to record an image file shot by a digital camera to the recording medium 7 by connecting the digital camera and the PC 1 via the I/O port 9 thereof.

Figure 7:
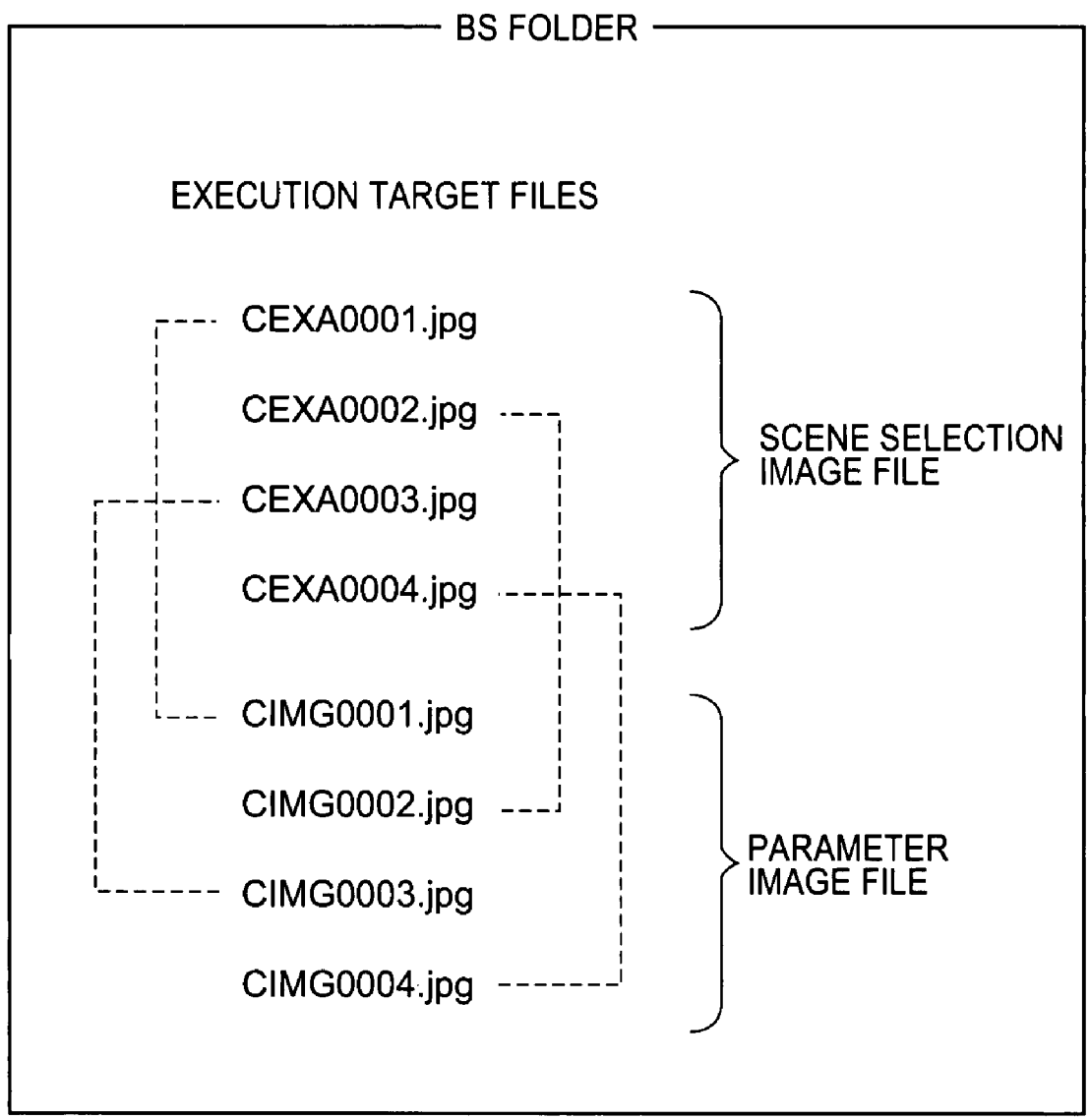
FIG. 7 is a diagram showing the contents of a BS folder.

FIG. 7 is a diagram showing the contents of the BS folder. As an example, here, four image files, each of which is a scene selection image file, are recorded. In addition, four parameter image files are recorded so as to individually correspond to the four image files.

Here, a parameter-image file is associated with a scene selection image file such that parameter image file and scene selection file paired by having same numbers in lower four digits of their filename are associated with each other. Accordingly, the user changes the filename of the parameter image file so that the number of lower four digits correspond to the lower four digits of the filename of the scene selection image file with which the user wishes to associate the parameter image file. Additionally, the first three digits of the filename of the parameter image file is given by "CIM" so that the scene selection image file and the parameter image file can be distinguished from each other.

For example, in order to associate a parameter image file with to a scene selection image file having a filename, "CEXA0001.jpg", the user gives the parameter image file a filename "CIMG0001.jpg"; in order to associate a parameter image file with a scene selection image file with a filename, "CEXA0002. jpg", the user gives the parameter image file a filename "CIMG0002.jpg"; in order to create a parameter image file with a scene selection image file with a filename, "CEXA0003.jpg", the user gives the created parameter image file a filename "CIMG0003.jpg"; and in order to create a parameter image file that corresponds to a scene selection image file with a filename, "CEXA0004. jpg", the user gives the created parameter image file a filename "CIMG0004.jpg". For changing the filename of the parameter image file, for example, the user first operates a mouse 5 or a keyboard 6 in such a state as shown in FIG. 7 where an image filename stored in the BS folder is displayed. Then, the user moves the cursor to a file, the filename of which the user wishes to change and clicks it. Upon the click operation, the state is changed and the user is allowed to change the filename. Then, the user input a filename by the keyboard 6, and can confirm the change of the filename by pressing down a return key when he/she thinks there is no problem with the input filename.

Figure 8:
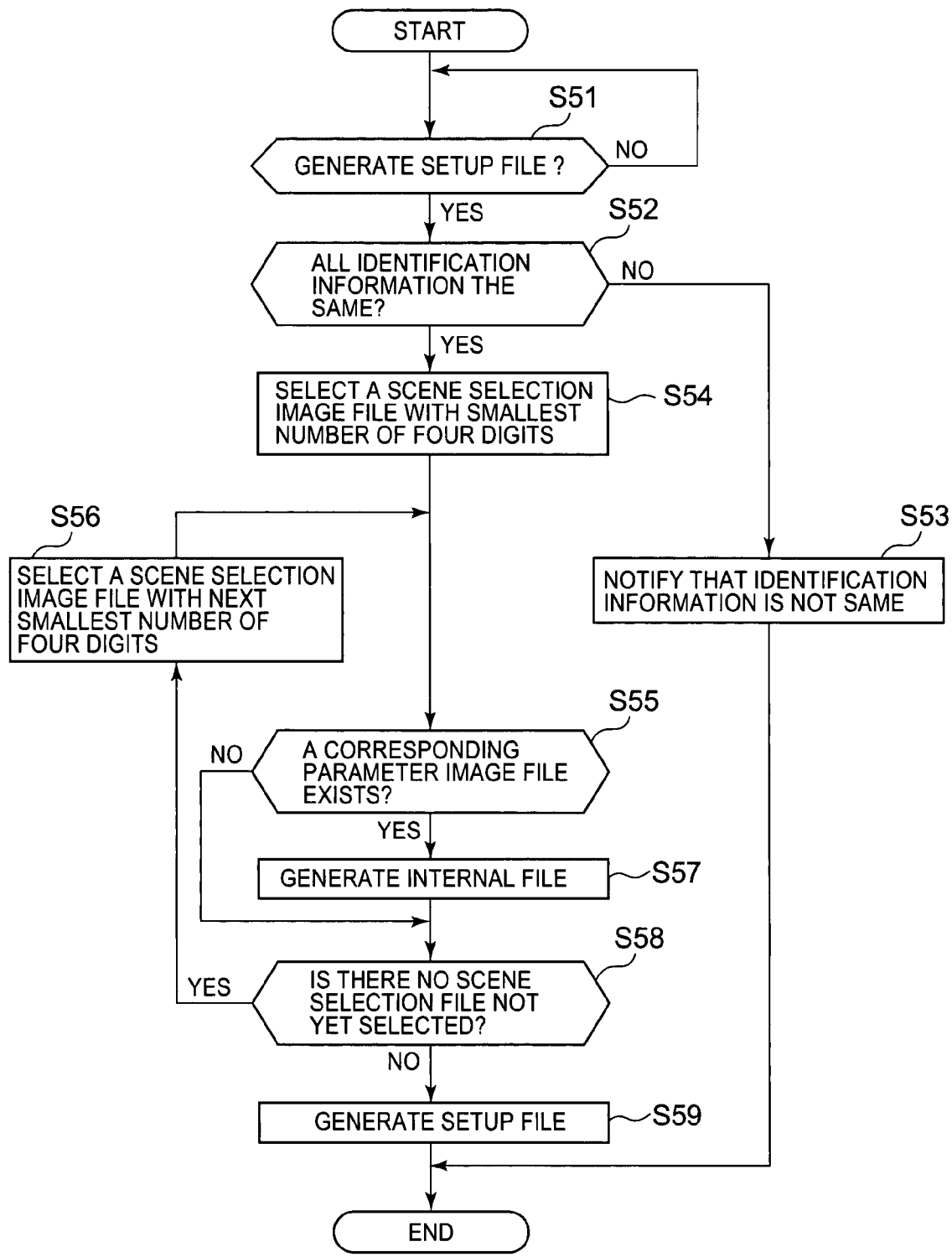
FIG. 8 is a flowchart showing an operation for generating a setup file.

The following describes an operation for generating a setup file on the basis of the scene selection image file and the parameter image file, with reference to the flowchart of FIG. 8. First, the CPU 2 determines whether or not to generate the setup file (step S51). This determination is made based on whether the cursor is moved on any one of execution target files by the user's operation of the mouse 5 or the keyboard 6 in such a state as shown in FIG. 7 where the filenames of the files within the BS folder is displayed, the user performed a click operation.

When it is determined in step S51 that the generation of setup file is not performed, the flow does not proceed from step S51 till it is determined that any setup file is to be generated. Then, when it is determined in step S51 that the generation of the setup file is to be performed, the CPU 2 determines whether among all parameter image files recorded on the BS folder, identification information showing a digital camera, by which an image within the digital camera is shot, correspond with each other (step S52). This identification information is included in the parameter image file, and the determination of correspondence is made based on this information.

When it is determined in step S52 that there is any parameter image file that has identification information which is different from the others, the CPU 2 displays a report notifying the user of the disunity in the identification information on the display section 8 (step S53), and terminates the operation. Also when there is no parameter image file recorded in the BS folder, the CPU 2 determines there is the lack of unity of the identification information.

On the other hand, when it is determined in step S52 that all the parameter image files have the same identification information, the CPU 2 selects a scene selection image file that has the smallest number in the lower four digits of filename (step S54). In the case where the scene selection image files of the filenames shown in FIG. 7 are recorded in the BS folder, the scene selection image file of the filename, "CEXA0001.jpg" is selected.

Next, the CPU 2 determines whether there is any parameter image file that should correspond to the selected scene selection image file within the BS folder (step S55). In other words, it is determined whether there is any parameter image file whose number of lower four digits in the filename corresponds to the number of lower four digits of filename of the selected scene selection image file.

When it is determined in step S55 that there is no parameter image file that corresponds to the selected scene selection image file in the BS folder, the flow proceeds step S58.

On the other hand, when it is determined in step S55 that there is any parameter image file that corresponds to the selected scene selection image file in the BS folder, an internal file is prepared based on the selected scene selection image file and a parameter image file that corresponds to the selected scene selection image file, and the internal file is recorded in the recording medium 7 (step S57). Then the flow proceeds to step S58. In other words, the shooting condition at the time of shooting the image in the corresponding parameter image file is extracted, and the extracted shooting condition is added to the selected scene selection image file to generate the internal file. This internal file is a part of a later-described setup file, and the setup file is constituted by the internal file.

In step S58, the CPU 2 determines whether there is any scene selection image file that is not selected in the BS folder. When it is determined in step S58 that there is a scene selection image file that is not yet selected, the CPU selects a scene selection image file that has the next smallest number of lower four digits of filename in step S56, and then the flow goes back to step S55.

On the other hand, when in step S58 there is no scene selection image file that is not selected within BS folder, a setup file is generated based on all the generated internal file, and the internal file is recorded (step S59).

Here, the internal file is generated based on the scene selection image file and its corresponding parameter image file, and the setup file is generated based on one or more internal files. However, it is possible to generate setup files individually. In other words, in step S57, the setup file may be generated based on a scene selection image file and a corresponding parameter image file, without generation of the internal file and the flow may proceed to step S58. In this case, the operation of step S59 becomes unnecessary.

Then, when the generated setup file is set up to the digital camera 51 via the external recording medium 11, it becomes possible to select the scene selection screen generated n the manner as described above, in the scene selection function, and it becomes possible set a shooting condition that corresponds to the scene selection screen.

In displaying a scene selection screen, which corresponds to a scene of a new kind, on a digital camera, the digital camera is operated to display the scene selection screen generated in the manner as described above. Further, on the digital camera, in displaying multiple sample images, a sample image area (in FIG. 5A, the portion of area 3) of the scene selection screen is cut out and displayed as each of the sample images that corresponds to a scene of a new kind. Further, for displaying the title, the portion of the title of the scene selection screen is cut out and displayed.

There is no need to say that the generated scene selection screens are displayed in the order designated by the user. Further, it is preferable the setup is achieved in such a way as not to be reset even if the digital camera if formatted.

By the way, the setup of the digital camera 51 using the setup file generated in the above-described manner can be performed in such a way as will be described in the following. First, a flash memory 63 serving as an external recording medium 11 in which the setup file is recorded is connected to the digital camera 51 in the state in which the power of the digital camera 51 is off. Then, when the user operates the power button of the digital camera 51 as pressing down the menu key to turn on the digital camera, the CPU 60 automatically reads out the setup file from the connected flash memory 63 and records the setup file in the memory 59, as a part of data used on the execution of scene selection function. On displaying the scene selection screen, the CPU 60 determines the display order in accordance with each of the filenames of the scene selection image files that constitute the setup file.

In other words, in the present embodiment, on adding a newly selectable scene selection screen to an imaging device having a shooting condition setting section which sets the imaging device for a shooting condition, upon receiving a selection of any one of scene selection screens corresponding individually to shooting scenes, by reading out the shooting condition corresponding to the selected shooting scene, from a storage section that stores the shooting conditions individually in association with the shooting scenes, a template composed of separate areas on each of which to display a display element being different from other display elements to be displayed on other areas is prepared, each display element is input individually, the template, to which the display elements are input, as the scene selection screen to be added, is set and the shooting condition is associated with the set scene selection screen.

Accordingly in the present embodiment, the setup file generation program, when activated, causes the digital camera to display the scene selection screen sample 21, paste a sample image and a background image on the scene selection screen sample 21 and displays it. Also, the program causes the digital camera to display the scene number, scene title and note input by the user. In this time, the scene selection screen sample 21c comes to a state of display being equal to a scene selection screen displayed in the scene selection function. Therefore, it is possible for the user to freely prepare a scene selection screen with imagining it. Further, it is possible to record the scene selection screen which is to be newly added, with the display order thereof being designated. Therefore, the user can designate the display order. Further, it is possible to associate a preferred shooting condition set at the time of shooting with the above data.

Modified Embodiment

The above embodiment may be modified as stated in the following.

(1) In the above embodiment, the user operates a keyboard to input a scene number, a scene title and a note. However, it is possible to configure the invention so as to select any one from previously prepared groups each constituted by scene numbers, scene titles and notes.

(2) In the above embodiment, the display order of the scene selection screen is determined in accordance with the filename of the scene selection image file. However, n a possible modification, information showing a display order may be added to a scene election image file.

(3) In the above embodiment, the display order of the scene selection screen to be prepared is selected from "A"-"D" (see FIG. 6A or FIG. 6B). However, in a possible modification, the user may determine any desired order of displaying.

(4) In the above embodiment, on the preparation of the setup file in the above embodiment, when it is determined that there is no parameter image file that corresponds to a selected scene selection image file (in step S55 in FIG. 8, the flow branching to N), it is determined that there is a scene selection image file having a second-smallest lower four digits in filename (step S58 in FIG. 8). However, in a possible modification, when it is determined that there is no parameter image file that corresponds to a selected scene selection image file, the generation of the internal file may be stopped and operation may proceed to step S59 to generate a setup file based on an already generated internal file.

(5) Further, in the above embodiment, a setup file is generated based on the scene selection image file and the parameter image file. However, in a possible modification, the generation of a setup file may be only by adding a shooting condition to a scene selection image file, without any basis of parameter image file.

(6) In the above embodiment, for a scene selection screen that is newly added, a shooting condition of a parameter image file that is associated with a scene selection image file is used. However, in a possible modification, a user may input or adjust the shooting condition, and the input or adjusted shooting condition is used as that of the scene selection screen to be newly added.

(7) In the above embodiment, scene selection screen sample comprising the sample image, the scene title, the note, the scene number, and the background image is recorded as image data of one screen and a setup file is generated. However, in a possible modification, a setup file comprising data of additional information in which sample image, scene title, note, scene number, and background image are associated with each other, not in a form of one screen image data, may be generated, and the scene selection screen may be reconstructed in the digital camera side based on the generated setup file.

Figure 11:
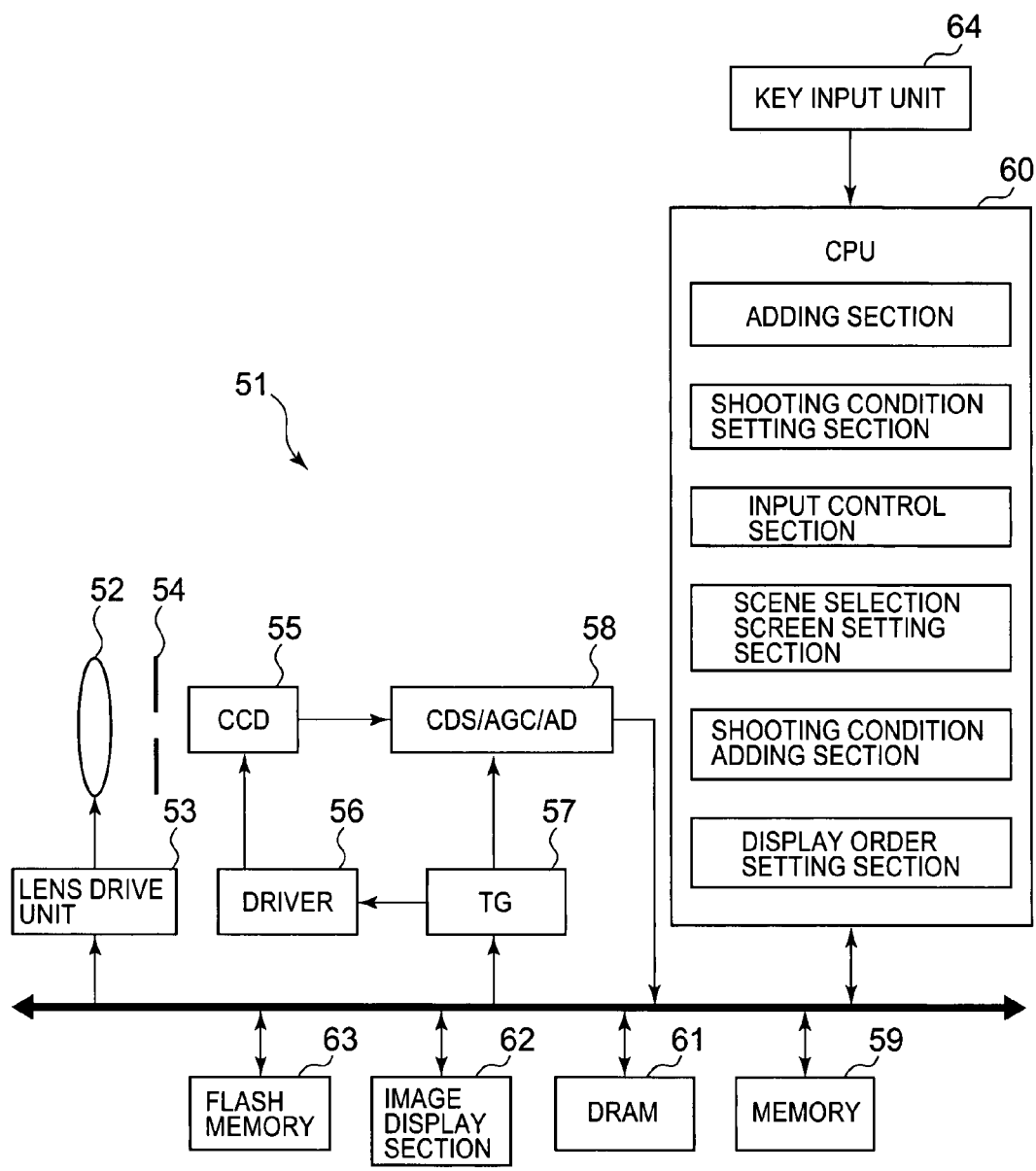
FIG. 11 is a block diagram showing a diagrammatic representation of the electric structure of the digital camera.

(8) In the above embodiment, PC is used for setting data of additional information as a scene selection screen, and for adding a shooting condition associated therewith. However, an imaging device, such as a digital camera, may be used for the setting, and in such a case, generated data of additional information and shooting condition may be associated with each other and stored to the memory 59 of the digital camera, without generation of the setup file. That is, as shown in FIG. 11, the digital camera 51 may store, in a memory 59 thereof, a template composed of separate areas on each of which to display a display element being different from other display elements to be displayed on other areas, and may further comprise an input control section that controls input of display elements so that each display element is input individually to each area of the template stored in the template storage section; a scene selection screen setting section that sets, as the scene selection screen, the template to which the display elements are input by the input control section; and a shooting condition adding section that associates the scene selection screen set by the scene selection screen setting section with a shooting condition. Further, the digital camera may allow the setting of the display order in the digital camera of the scene selection screens set by the digital camera.

(9) Further, in the above embodiment, the shooting condition at the time at which the selected sample image is shot may automatically set as the shooting condition of the scene selection screen. In this case, parameter image file becomes unnecessary. Or, a possible configuration substitutes a parameter image file with a sample image file that corresponds to the sample image selected, by automatically copying and moving the sample image file to the BS folder. In the case where a parameter image file is substituted with the sample image file, the filename of the copied and moved sample image file may automatically changed based on the filename of a corresponding scene selection image file.

(10) The imaging device is not limited to digital camera, which is used as the embodiment described above. In possible modifications, the present invention can be applied to a cellular phone, a PDA, and a digital video camera. Whatever device is possible if it is a device that can edit image data and add a shooting condition.

(11) In the above embodiment, the programs for preparing the setup file and data for preparing the same is stored in ROM 3. However, these may be installed to the recording medium 7 from an external recording medium 11 or a communication network. The CPU 2 may read out the installed program from the recording medium 7 and execute the read out program.

Various embodiments and changes may be made thereunto without departing from the broad spirit and scope of the invention. The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

This application is based on Japanese Patent Application No. 2006-140165 filed on May 19, 2006 and Japanese Patent Application No. 2007-031591 filed on Feb. 13, 2007 including specification, claims, drawings and summary. The disclosure of the above Japanese Patent Application is incorporated herein by reference in its entirety.

What is claimed is:

1. A scene selection screen generation device comprising:
    a template storage section that stores a template of a scene selection screen comprising separate areas, each of which is for displaying thereon a display element that is different from other display elements to be displayed on other areas;
    an input control section that controls input of display elements so that each display element is input individually to each area of the template stored in the template storage section;
    a scene selection screen setting section that sets, as the scene selection screen, the template to which the display elements have been input by the input control section; and
    a shooting condition adding section that associates the scene selection screen set by the scene selection screen setting section with a shooting condition to be set when the scene selection screen is selected.

2. The scene selection screen generation device according to claim 1, wherein the display elements include at least one of (i) a sample image, (ii) a scene title, and (iii) a note for explaining at least one of an image quality of an image to be obtained by shooting and an operation of a camera.

3. A scene selection screen adding system for adding a newly selectable scene selection screen to an imaging device having a shooting condition setting section which sets a shooting condition for the imaging device upon receiving a selection of any one of scene selection screens corresponding individually to shooting scenes, by reading out a shooting condition corresponding to the selected shooting scene, from a storage section that stores the shooting conditions individually in association with the shooting scenes, the scene selection screen adding system comprising:
 a template storage section that stores a template comprising separate areas, each of which is for displaying thereon a display element that is different from other display elements to be displayed on other areas;
 an input control section that controls input of display elements so that each display element is input individually to each area of the template stored in the template storage section;
 a scene selection screen setting section that sets, as the scene selection screen to be added, the template to which the display elements have been input by the input control section;
 a shooting condition adding section that associates the scene selection screen set by the scene selection screen setting section with a shooting condition;
 a display order setting section that sets a display order in which the scene selection screen set by the scene selection screen setting section is to be displayed; and
 an adding section that adds the scene selection screen set by the scene selection screen setting section so that the scene selection screen is displayed in the order set by the display order setting section, without causing any change in display order among previously prepared scene selection screens, when the imaging device displays the scene selection screen.

4. The scene selection screen adding system according to claim 3, wherein the display elements include at least one of (i) a sample image, (ii) a scene title, and (iii) a note for explaining at least one of an image quality of an image to be obtained by shooting and an operation of a camera.

5. The scene selection screen adding system according to claim 3, wherein the template storage section, the input control section, the scene selection screen setting section, the shooting condition adding section, and the display order setting section are provided to a computer that is independent from the imaging device; and
 wherein the adding section is provided to the imaging device.

6. The scene selection screen adding system according to claim 5, wherein the adding section adds the scene selection screen set by the scene selection screen setting section based on a setup file in which the scene selection screen set by the scene selection screen setting section is associated with the shooting condition by the shooting condition adding section.

7. A method for generating a scene selection screen, the method being performed by an imaging device having a shooting condition setting section which sets a shooting condition for the imaging device upon receiving a selection of any one of scene selection screens corresponding individually to shooting scenes, by reading out a shooting condition corresponding to the selected shooting scene, from a storage section that stores the shooting conditions individually in association with the shooting scenes, the method comprising:
 controlling input of display elements so that each display element is input individually to an area of a template of a scene selection screen comprising separate areas, each of which is for displaying thereon a display element that is different from other display elements to be displayed on other areas;
 setting, as the scene selection screen, the template to which the display elements have been input; and
 associating the set scene selection screen with a shooting condition for the imaging device to be set when the scene selection screen is selected.

8. The method according to claim 7, wherein the display elements include at least one of (i) a sample image, (ii) a scene title, and (iii) a note for explaining at least one of an image quality of an image to be obtained by shooting and an operation of a camera.

9. A method for adding a newly selectable scene selection screen to an imaging device having a shooting condition setting section which sets a shooting condition for the imaging device upon receiving a selection of any one of scene selection screens corresponding individually to shooting scenes, by reading out a shooting condition corresponding to the selected shooting scene, from a storage section that stores the shooting conditions individually in association with the shooting scenes, the method comprising:
 controlling input of display elements so that each display element is input individually to each area of a template comprising separate areas, each of which is for displaying thereon a display element that is different from other display elements to be displayed on other areas;
 setting, as the scene selection screen to be added, the template to which the display elements have been input;
 associating the set scene selection screen with a shooting condition;
 setting a display order in which the set scene selection screen is to be displayed; and
 adding the set scene selection screen so that the scene selection screen is displayed in the set order, without causing any change in display order among previously prepared scene selection screens, when the imaging device displays the scene selection screen.

10. The method according to claim 9, wherein the display elements include at least one of (i) a sample image, (ii) a scene title, and (iii) a note for explaining at least one of an image quality of an image to be obtained by shooting and an operation of a camera.

11. An imaging device having a shooting condition setting section which sets a shooting condition for the imaging device upon receiving a selection of any one of scene selection screens corresponding individually to shooting scenes, by reading out a shooting condition corresponding to the selected shooting scene, from a storage section that stores the shooting conditions individually in association with the shooting scenes, the imaging device comprising:
 a template storage section that stores a template of a scene selection screen comprising separate areas, each of which is for displaying thereon a display element that is different from other display elements to be displayed on other areas;
 an input control section that controls input of display elements so that each display element is input individually to each area of the template stored in the template storage section;
 a scene selection screen setting section that sets, as the scene selection screen, the template to which the display elements have been input by the input control section; and
 a shooting condition adding section that associates the scene selection screen set by the scene selection screen setting section with a shooting condition to be set when the scene selection screen is selected.

12. The imaging device according to claim 11, wherein the display elements include at least one of (i) a sample image, (ii) a scene title, and (iii) a note for explaining at least one of an image quality of an image to be obtained by shooting and an operation of a camera.

13. A non-transitory computer-readable storage medium having a program recorded thereon to cause a computer to execute functions comprising:

controlling input of display elements so that each display element is input individually to an area of a template of a scene selection screen comprising separate areas, each of which is for displaying thereon a display element that is different from other display elements to be displayed on other areas;

setting, as the scene selection screen, the template to which the display elements have been input; and associating the set scene selection screen with a shooting condition to be set when the scene selection screen is selected.

14. The computer-readable storage medium according to claim 13, wherein the display elements include at least one of (i) a sample image, (ii) a scene title, and (iii) a note for explaining at least one of an image quality of an image to be obtained by shooting and an operation of a camera.

* * * * *